Oct. 23, 1945.   C. M. HERZ   2,387,446
BOARD FEED FOR WOODWORKING MACHINES
Filed July 31, 1943   2 Sheets-Sheet 1
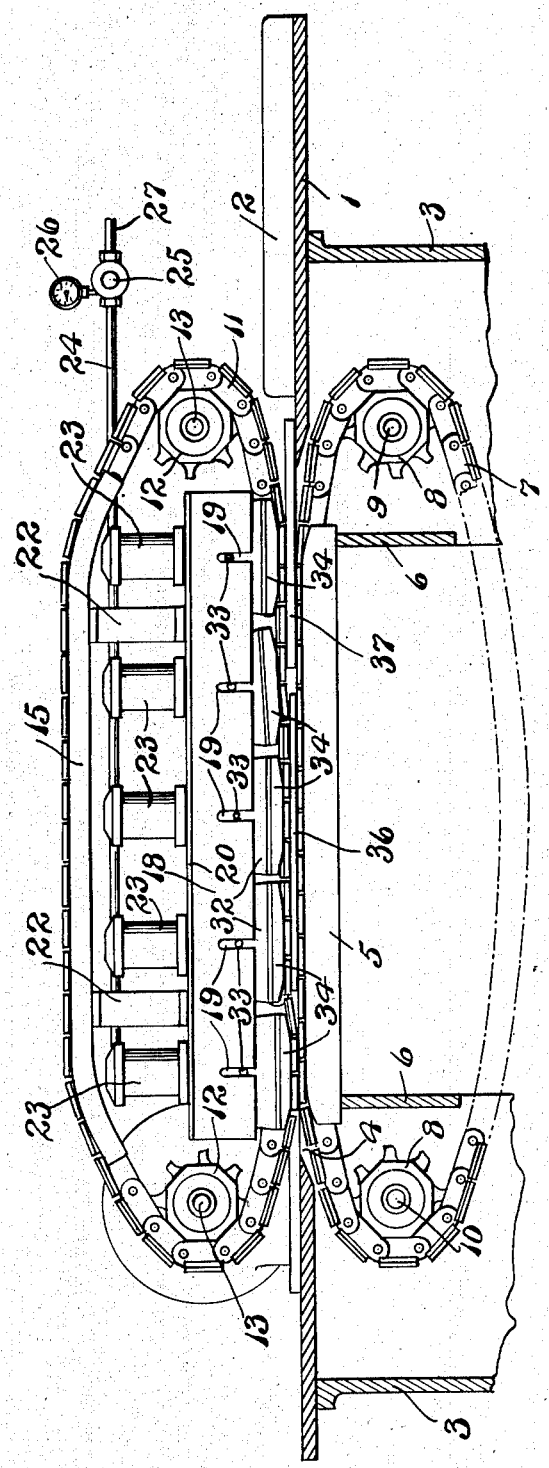
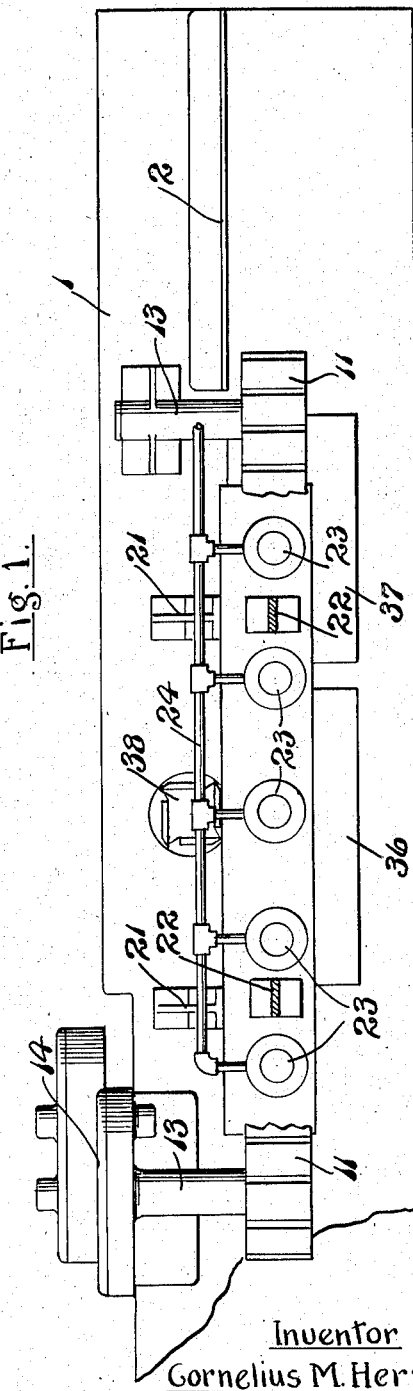
Inventor
Cornelius M. Herz.
By Liverance & VanAntwerp
Attorneys.

Oct. 23, 1945.  C. M. HERZ  2,387,446

BOARD FEED FOR WOODWORKING MACHINES

Filed July 31, 1943  2 Sheets-Sheet 2

Inventor
Cornelius M. Herz
By Linnance & Van Antwerp
Attorneys.

Patented Oct. 23, 1945

2,387,446

UNITED STATES PATENT OFFICE 2,387,446

BOARD FEED FOR WOODWORKING MACHINES

Cornelius M. Herz, Grand Rapids, Mich., assignor to Irwin Machinery Company, Grand Rapids, Mich., a corporation of Michigan Application July 31, 1943, Serial No. 496,856

10 Claims. (Cl. 198—162)

This invention relates to a feed for wood or metal working machines whereby material which is carried through and fed by the machine is directed and held in a straight line of movement under all conditions of operation, irrespective of varying thickness of the work fed or of the different thicknesses of several separate pieces of work consecutively fed through the machine.

It is a primary object and purpose of the present invention to provide a practical feed for work to be acted upon and insure that the work is held securely against deviation from a prescribed path of movement to and beyond cutters or other tools to which the work is fed. I have applied this invention practically in conjunction with woodworking machines but it is to be understood that other material than wood, for example, metal may be fed to machining tools to act thereon and the work held against undesired lateral or other movements during such feeding and operating processes.

An understanding of the invention may be had from the following description taken in connection with the accompanying drawings, in which:

Fig. 1 is a longitudinal vertical section through the feed mechanism of my invention, the endless feed chains being shown in side elevation.

Fig. 2 is a plan with parts broken away and shown in section.

Like reference characters refer to like parts in the different figures of the drawings.

Figure 3:
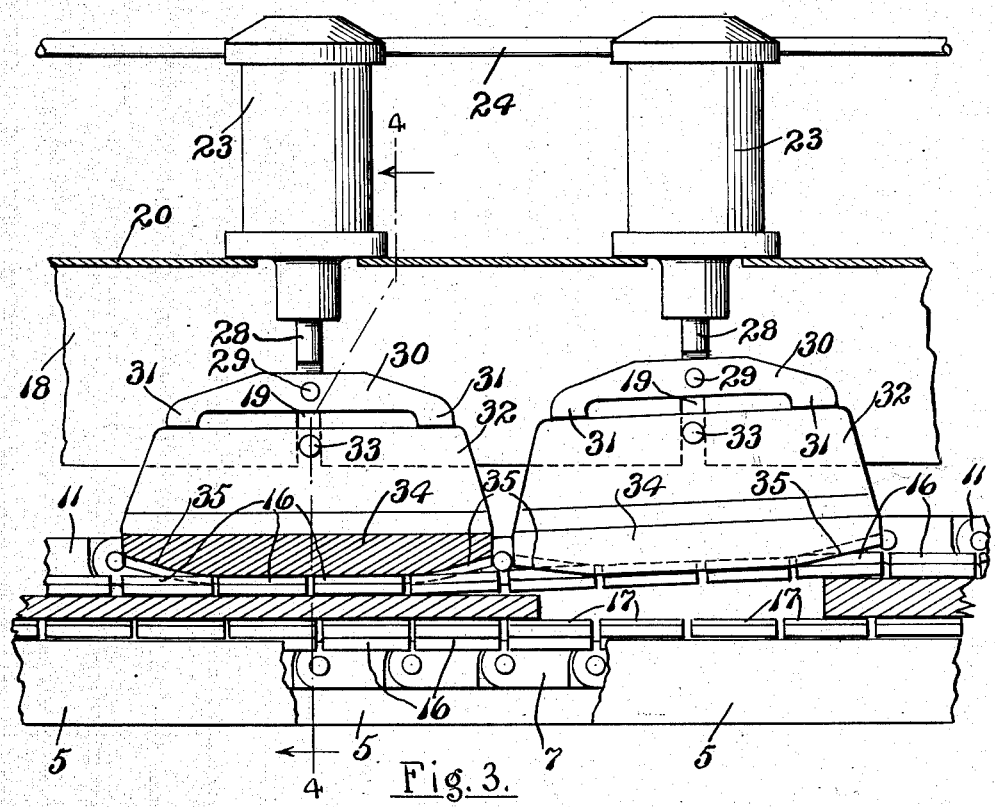
Fig. 3 is a fragmentary enlarged longitudinal vertical section through the machine.

In the embodiment of the invention shown a horizontal table 1 is used over which boards, veneers or other similar material is placed with one edge against a guide gauge 2 located at one end of the table, the boards or other material being entered into the feeding apparatus adjacent the inner end of said guiding gauge. The table is supported above a suitable housing 3 and between its ends and sides is provided with a longitudinal opening indicated at 4.

Spaced apart parallel horizontal bars 5 are located underneath the opening 4, carried by suitable cross members 6 of the under supporting structure. The bars 5 at their upper sides are provided with V-shaped grooves extending lengthwise of the bars.

A lower endless conveyor chain 7 consisting of a plurality of links pivotally connected together at adjacent ends is mounted upon spaced sprockets 8 on cross shafts 9 and 10 (Fig. 1). An upper endless conveyor feed chain 11 of similar structure is mounted upon spaced sprockets 12 carried on shafts 13 which are mounted on suitable brackets fixed to and extending upwardly from the upper side of the table (Fig. 2). One of said shafts 13 may be driven, as by an electric motor, through reduction gearing housed within the housings 14. The upper run of the upper feed chain 11 rides over spaced bars 15 which longitudinally at their upper edges have V-shaped guide grooves therein similar to those in the bars 5. The links of the endless feed chains 7 and 11 are extended laterally so that the links have a width slightly less than the width of the opening 4 in the table 1 (Fig. 4), and said links adjacent their edges and at their inner sides are provided with V-ribs 16 to traverse the V-grooves in the bars 5 and 15. The links of the lower feed chain 7 preferably at their outer sides carry narrow and thin spaced apart bars 17 permanently secured in place (Fig. 4) extending substantially the full length of the links. Such bars 17 are not essential to the present invention but are used in conjunction with the method of clamping and smoothing out the wrinkles or buckles in veneers in accordance with the invention disclosed in the pending application, Ser. No. 439,750, filed April 20, 1942.

Directly over the longitudinal openings 4 in the table 1 a pair of spaced plates 18 are mounted, being located in parallel vertical planes and disposed between the upper and lower runs of the upper feed chain 11. Each of the plates 18 has vertical slots 19 therein cut from the lower edges of said plates upwardly substantially halfway through said plates as shown in Fig. 1. Said plates are permanently connected with a horizontal metal cover plate 20 located over the upper edges thereof and which is connected with the upper horizontal portion of supporting brackets 21, the lower ends of which are secured to the table 1. The bars 15 previously described are held and supported by vertical posts 22 fixed at their lower ends to the plate 20 (Fig. 1).

A plurality of vertical cylinders 23, the number of which may be varied, are mounted upon the horizontal plate 20 and have reduced piston rod guiding projections at their lower ends (Fig. 3) passing through openings in said plate 20. Said cylinders are adapted to be supplied with fluid pressure through a pipe 24 from which branches lead to the upper end portions of said cylinders. The pressure of a fluid, such as compressed air or its equivalent, is maintained at a selected pressure by a pressure reducing valve 25 associated with which is a pressure gauge 26, being disposed between the pipe 24 and the fluid pressure supply pipe 27 which leads to a source of compressed air or other fluid pressure.

Figure 4:
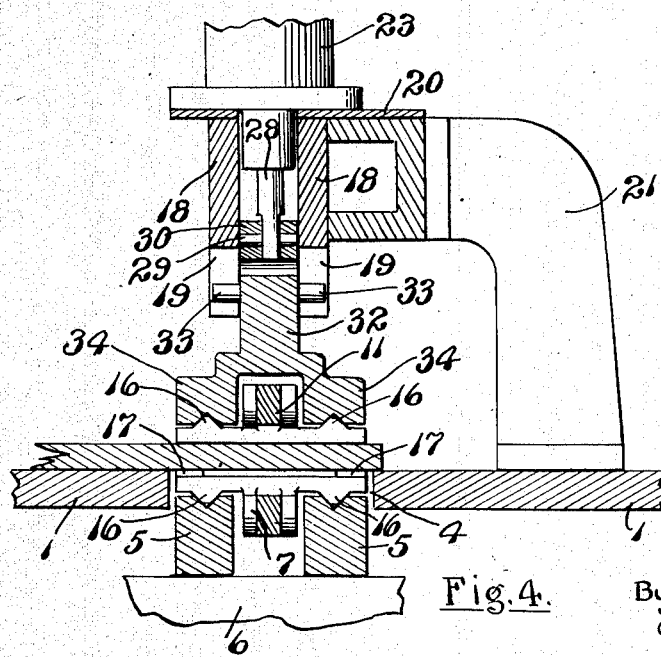
Fig. 4 is a fragmentary horizontal section substantially on the plane of line 4—4 of Fig. 3 looking in the direction indicated.

Compressed air entered in the upper end portions of the cylinders 23 acts upon pistons (not shown) in said cylinders tending to move them downwardly. Piston rods 28 connected with said pistons extend below the cylinders and are pivotally connected at 29 between the ends of bars 30 which have downturned end foot portions 31 resting against the upper horizontal sides of pressure members 32. The members 32 at their upper portions pass between and are guided by the side plates 18 and have pins 33 extending therefrom into the slots 19 (Fig. 4). At the lower portions of the pressure members they are widened laterally to provide two spaced apart longitudinal sides 34 each at its lower side having a V-groove therein shaped to receive the ribs 16 on the links of the upper feed chain 11 passing underneath. It is evident that the pressure members are vertically movable and may tilt about the axes of the pins 33. At the under sides of the pressure members 32 they are shaped with a flat horizontal intermediate portion with ends upwardly inclined shown at 35 (Fig. 3).

With fluid pressure at a selected desired amount controlled by the reducing valve 25 and indicated by the gauge at 26, the pressure members are forced in a downward direction with a pressure equal to the area of the pistons within said cylinders multiplied by the pressure per unit area and against the links of the lower run of the upper endless feed chains 11, said links in turn bearing against the links of the upper run of the lower feed chains 7. Upon entering a length of work such as a board 36 (Fig. 1) at the entrance end of the feeding mechanism, said pressure members are moved upwardly with the pins 33 traversing the slots 19 a distance equal to the thickness of the board 36 each pressure member being elevated as it is reached. If the thickness of the board 36 varies between its ends the pressure members maintain their pressure against the board irrespective of variations in thickness, and if the thickness varies abruptly a member 32 may tilt about the axis of its pins 33 to correspond. In this manner not only is the board or other work securely and firmly held against sidewise movement which has heretofore occurred because of a variation in pressure due to variation in thickness of the board, but at all times the pressure acting upon the board remains substantially constant. Furthermore, the feeding does not have to be of boards of approximately the same thickness following one after the other but boards of greater thickness, as shown at 37, may follow narrower boards, shown at 36, with a lifting of the pressure members in accordance with the increased thickness of the board and the tilting thereof when its pressure is applied partly to links engaging the thinner board and partly to those engaging the thicker board. Furthermore, the machine does not have to be reset for different thicknesses of boards as there is a practical handling of all thickness of boards between a minimum and maximum thickness, the maximum thickness being governed by the length of the slots 19 and the distance that the pins 33 may travel upwardly therein. The links of the chains likewise are held against any lateral movement by the engagement of their projecting V-ribs 16 in the grooves in upper sides of the bars 5 and the lower sides of the pressure members.

With this novel feed mechanism the work to be acted upon may be carried to and past a driven cutter head 38, as an example, which rotating under high speed cuts the edges of the boards, veneers and the like presented thereto in a perfectly straight line cut without danger of lateral shifting, the boards being held under constant substantially unvarying pressure and the chain links held against lateral shifting movement as described. It is to be understood that the feed is not limited in any way to machines having cutter heads like that indicated at 38, but is available with many other kinds of woodworking cutters, saws and the like. Also the material which may be fed by the feeding mechanism of my invention is not restricted to wood. The feed which I have invented may be utilized in conjunction with metal working machines quite as well.

The feed mechanism which I have devised is of a very useful nature. It has proven practical and successful in severe tests being particularly useful to maintain the work acted upon in a desired undeviating line of movement as it is fed and passed by the cutter or other implement acting thereon.

The invention is defined in the appended claims and is to be considered comprehensive of all forms of structure coming within their scope.

I claim:

1. Apparatus of the character specified comprising, continuous feeding means positioned with respect to each other for the engagement and carrying therebetween, in the direction of their lengths, materials of varying thicknesses entered at one end of the feeding means, a plurality of spaced pressure units located to transmit pressure to said materials lengthwise thereof, each including an immediate pressure transmitting element tiltable in response to the passage of the adjacent ends of lengths of material of varying thickness, and means for applying equal and substantially constant pressure to each of said pressure units as material of varying thicknesses is passed therebetween.

2. Apparatus of the character described comprising, feeding means for engagement with and carried by said feeding means of separated lengths of material of varying thickness entered into and passed therebetween, spaced pressure units located to transmit pressure force to the material thus fed, each including an immediate pressure transmitting element tiltable in response to the passage of the adjacent ends, each length of material of varying thickness, and means for applying a common yielding fluid pressure to said pressure units, whereby material fed through said feeding means is pressed against by said pressure units to substantially the same amount in all variations of thickness of the material fed.

3. Apparatus of the character specified comprising, upper and lower endless feed chains positioned with respect to each other for engagement and carrying through between adjacent upper and lower runs of the feed chains of separated lengths of material of varying thickness entered at one end therebetween, means for guiding the upper run of the lower feed chain to hold it with the material against it from lateral movement, a plurality of spaced pressure heads located over the lower run of the upper feed chain, each mounted for independent vertical movement and each including an immediate pressure transmitting element tiltable in response to the passage of the adjacent ends of lengths of material of varying thickness, and means for applying a common yielding substantially constant pressure to each of said pressure heads, transmitted by said heads to the materials of varying thickness engaged thereby.

4. Apparatus of the character specified comprising, upper and lower endless feed chains positioned with respect to each other for engagement with and carrying between adjacent upper and lower runs of the feed chains of material entered at one end therebetween, means for guiding the upper run of the lower feed chain to hold it with the material against it from lateral movement, a plurality of spaced pressure heads located over the lower run of the upper feed chain, each mounted for independent vertical movement and each including an immediate pressure transmitting element tiltable in response to the passage of the adjacent ends of lengths of material of varying thickness, the axis of tilting of each head being transverse to the lengths of the material fed, and means for applying a predetermined yielding substantially equal pressure by each of said pressure heads to material of varying thicknesses engaged thereby.

5. In an apparatus of the character specified, upper and lower endless chain feed elements, each having a plurality of pivotally connected links, each of said links having outer bearing faces adapted to come against each other when at the upper and lower runs of the lower and upper feed chains respectively, and to bear against opposite sides of material having substantially parallel opposite faces entered thereinto and moved thereby, means supporting and guiding the upper run of the lower feed chain and for holding the links thereof against lateral deviation from straight line movement, a plurality of pressure heads disposed in horizontal alinement over the lower run of the upper chain and bearing against the upper sides of the links thereof, means for vertically guiding said pressure heads in upward and downward movement located above the lower portions of said pressure heads, said guiding means also permitting independent tilting movement of said pressure heads about horizontal axes located above the bearing portions of said pressure heads, a piston associated with each pressure head and a piston rod extending from said piston to and operatively associated with the upper end of each pressure head, and means connecting said pistons for conducting a predetermined equal yielding fluid pressure into each of said pistons to be transmitted through said piston rods to said pressure heads, as specified.

6. A construction containing the elements in combination defined in claim 5, each of said pressure heads at its lower side having an intermediate normally located horizontal section and an upwardly and outwardly inclined section at each end of the horizontal section, and each of said pressure heads at its lower side being provided with spaced apart longitudinal guide grooves, said links of the upper feed chain at their inner sides having cooperating guide ribs to traverse said grooves.

7. In feeding apparatus of the character described, a horizontal feed table having a longitudinal opening therein, a lower endless feed conveyor comprising a plurality of pivotally connected links mounted underneath said table and supported to have its upper run traverse said longitudinal opening in the table with the upper surfaces of said upper run of the links of the chain substantially flush with the upper side of the table, a second similar endless feed chain located over the lower feed chain, means supporting said second upper feed chain in position that the lower run thereof will have the under side of its links adapted to bear against the upper side of the links of the upper run of the lower feed chain, between said links material being adapted to be received to be fed from one end to the other of said conveyor feed chains, spaced horizontal bars located and supported in parallel vertical planes over the lower run of the upper feed chain, said bars at their lower edges having upwardly cut slots therein, pressure heads having upper end portions extending between said bars, guide means on said pressure heads extending laterally into the slots in the bars and means for applying a yielding pressure to each of said pressure heads to normally force them in a downward direction but permitting upward movement thereof, and also tilting movement about the axis of said guide means.

8. In feeding apparatus having upper and lower endless chain conveyor elements, one over the other between adjacent lower and upper runs of which material is adapted to be fed, of a pair of spaced plates located in parallel vertical planes and disposed in substantially horizontal position over the lower run of the upper feed chain, each of said plates in the length thereof having a plurality of spaced vertical slots extending from their lower edges upwardly a distance, a plurality of vertical cylinders located in spaced relation to each other over the slots in said plates, piston rods extending downwardly therefrom, a pressure head located underneath each cylinder, the heads being spaced apart short distances at their ends and covering substantially the length of the lower run of said upper feed chain, said pressure heads having upper portions extending between said plates, pins extending laterally from said heads into the slots in the plates, means for carrying fluid pressure into the upper ends of the cylinders to force the piston rods thereof in a downward direction, and means for transmitting the pressure of said piston rods to the upper sides of said heads, as specified.

9. In a construction containing the elements in combination defined in claim 8, means for selectively regulating the fluid pressure of said pressure fluid carried to said cylinders to maintain said pressure substantially constant.

10. In a construction containing the elements in combination defined in claim 8, said means for transmitting the pressure to the upper side of the pressure heads comprising a bar pivotally mounted between its ends at the lower end of each piston rod, the ends of the bars bearing against the upper sides of said pressure heads adjacent the ends thereof.

CORNELIUS M. HERZ.